Sept. 8, 1959   C. E. BECK   2,902,799
ABRADING HEAD
Filed Feb. 24, 1959
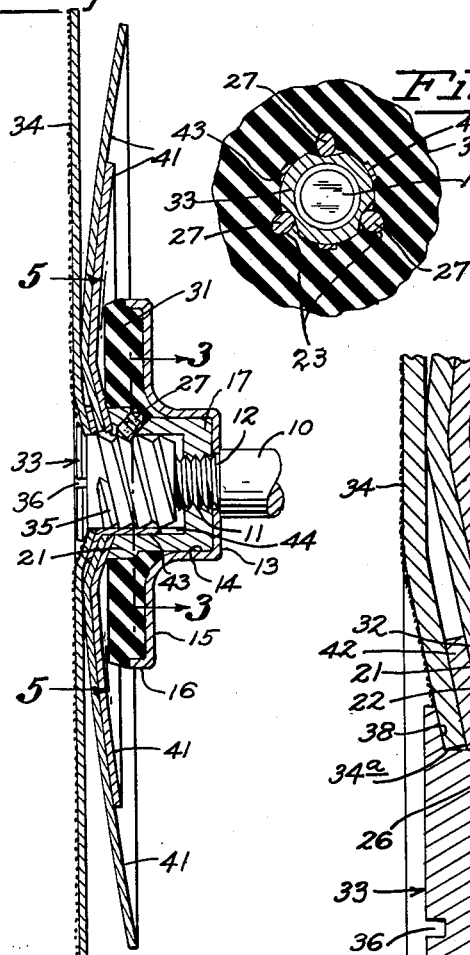
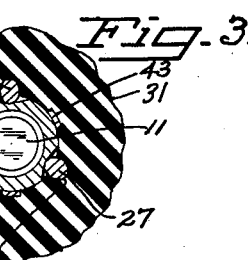
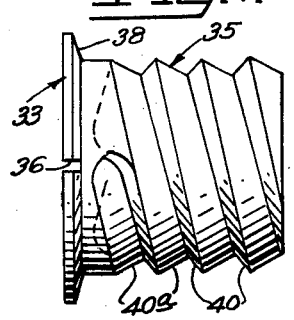
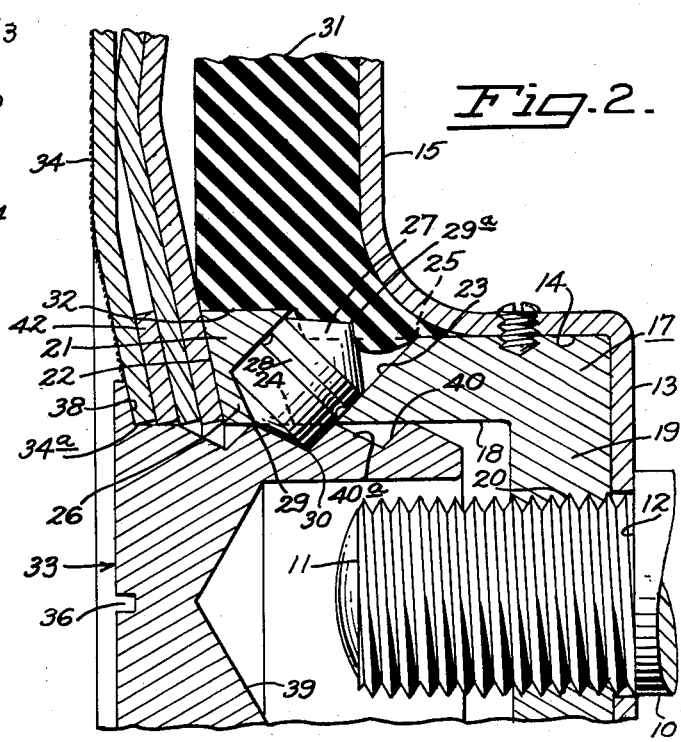
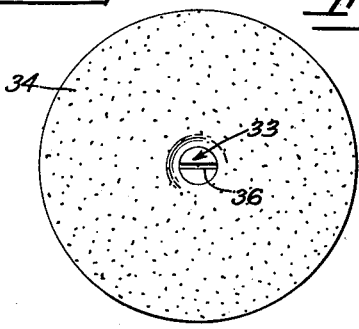
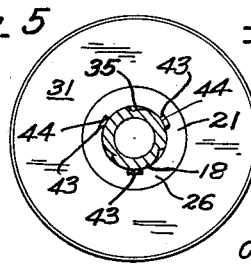
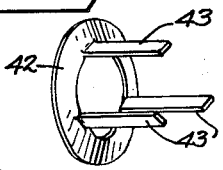
INVENTOR.
CARL E. BECK
BY Arlington L. White
ATTORNEY

United States Patent Office 2,902,799
Patented Sept. 8, 1959

2,902,799
ABRADING HEAD

Carl E. Beck, San Francisco, Calif.

Application February 24, 1959, Serial No. 794,918

12 Claims. (Cl. 51—197)

This invention relates to heads for abrading discs, sometimes referred to as sanding heads, and more particularly relates to such devices having means for conveniently changing the abrading disc thereon.

Heads for abrading discs are broadly well known, and the object of the present invention is to provide such a head in which an abrading disc may be changed with improved facility by manipulation of a push-in retainer screw, the threads of which are engaged by a plurality of resiliently actuated lock pins or plungers which engage in the threads of the retainer screw and thereby maintain the abrading disc at its mounted position.

Briefly described, the invention comprises a head socket member threadably mountable on a rotatable shaft, the socket having a smooth internal wall to its bore, as distinguished from the threaded internal wall of such sockets as presently known. A headed retainer screw is provided having a threaded shank which fits slidably in the socket, the flange of the head of the screw securing the abrading disc in position, the retainer screw being maintained in the socket by resiliently mounted locking pins or buttons which are axially rotatable and extend through the wall of the socket and engage the threads of the screw, the relative angles of the faces of the threads being such that the retainer screw may be pushed into the socket without rotation, but is locked therein by the resiliently mounted pins engaging in the threads. The retainer screw is removed by rotation, the locking pins serving as the complemental thread. Suitable backing plates may also be provided for the abrading disc.

A preferred form in which the invention may be exemplified is described herein and illustrated in the accompanying drawing which is made a part hereof.

In the drawing:

Fig. 1 is a transverse sectional view of the invention;

Fig. 2 is an enlarged fragmentary sectional view of a portion of Fig. 1;

Fig. 3 is a fragmentary transverse section on line 3—3 of Fig. 1;

Fig. 4 is a front face view of Fig. 1, the scale being reduced;

Fig. 5 is a front face view of a rubber disc member, on line 5—5 of Fig. 1;

Fig. 6 is a perspective view of a ring member, and

Fig. 7 is an enlarged side view of a retaining screw member shown in Fig. 1.

Referring to the drawing in which like reference characters indicate corresponding parts in the several views, 10 is a rotatable shaft driven by any suitable motive force and having at its free end threads 11 and shoulder 12. Circumferentially of the threads 11 and contacting the shoulder 12 is a backing plate member 13 having a recessed cup 14 and an annular radially extended plate portion 15 terminating at its outer circumferential edge in an upturned flange 16. In the recessed cup portion 14 of the backing plate there is snugly mounted an annular socket nut 17 having an open smooth bore or recessed socket 18 therein which has a closure wall 19 at its base, such closure base wall having an axial threaded opening 20 whereby the socket nut may be tightly mounted upon the threads of shaft 10, and thus also securely and tightly mount the backing plate 13 upon the shaft. At its outer open end the socket nut has a radially outwardly extended flange rim 21 having its face 22 inclined downwardly and inwardly from its circumferential edge. If desired, other conventional suitable means may additionally secure the plate 13 to the socket nut and shaft, such as a machine screw, in a well-known manner.

At an angle, preferably of substantially 45 degrees to the axis of the socket nut 17, there are a plurality of equally circumferentially spaced tubular cylindrical bores 23 through the wall of the socket nut, three being shown, the inner opening 24 of the bores being adjacently spaced from the open end of the socket, and the opposite ends of such bores being adjacently spaced from the open end of the socket, and the opposite ends of such bores being adjacent to the lower portion of the circumferential face of the flanged rim 21, as at 25. The bores 23 do not extend, in their full diameter, entirely through said nut wall, the inner opening 24 being only a portion of such diameter, leaving a body of the wall of flanged rim 21 which provides a stop member 26.

Within the tubular cylinder bores 23 are mounted cylindrical locking pins 27 which are rotatable and snugly slidable axially in the bores. These locking pins have a circumferential groove 28 therein for carrying a supply of lubrication to facilitate both sliding and rotation thereof. The opposite ends of the pins are conically tapered to an apex, as at 29 and 29a, the taper 29 at the inner end of the pin being critical and the taper 29a at the opposite end being merely convenient as a base though, if desired, it may have a taper similar to the opposite end to make the pin reversible. The incline at the conical taper at the inner end of the pin is at an angle of substantially 20 to 30 degrees relative to its base, and the base of the cone being 90 degrees to the side wall, the vertex of the angle at the circumferential base of the cone is substantially of the order of 110 to 120 degrees. A portion of the circumference of the inner end of the pins extends through the inner opening 24 of socket 18, which, due to the 45 degree angle of the bore, provides a circumferential portion at the base edge of the conical taper providing an angled shoulder 30 within the socket, the side walls of the pin being at 45 degree angle and the taper being at substantially 30 degrees to the inner wall of the socket. The diametrically opposite portion of the conical wall bears against the stop member 26 to maintain the pin against passing through the inner opening of the bore. With these angles of the pins and bores the apices 29 of the conical wall at the inner end of the pins will be substantially aligned or flush with the inner wall of the socket when the conical wall of the pin is seated against the stop member, as best shown in Fig. 2.

The inner conical ends of pins 27 are resiliently urged to constantly maintain a seat against the stop member 26 by means of a resilient disc member 31 which is snugly circumferential of the socket nut and which is mounted with one of its faces contacting the face of backing plate 13 and being maintained within the confines of flange 16 of radial plate 15. The resilient disc is of sufficient thickness so that its opposite planar face is substantially co-planar with the outer edge of the face of the flanged rim 21 of the socket nut 17, a suitable central opening 32 being provided in the resilient disc member to snugly receive therein the socket nut, the outer ends 29a of the conical pins bearing against the wall of the central opening of the disc.

A threaded retainer screw indicated 33 is provided for securing an abrading disc 34 coaxially upon the head, manifestly being inserted through central opening 34a of said disc. The retainer screw has its shank threaded as at 35 and has the usual slotted head 36, the underface thereof being conventionally bevelled as at 38, for seating the abrading disc firmly against the inclined face of the rim 22 of the socket nut. The outer diameter of the threaded shank of the retainer screw is substantially the same as the inner diameter of socket 18, allowing for convenient slidable clearance. The retainer screw may be hollowed by bore 39 to receive the terminal threaded end 11 of the shaft 10. Preferably, there are a plurality of parallelly helical lead threads 35, three being exemplified herein, to correspond with the similar number of locking pins 27. The vertex of the angle of the side walls of these threads is substantially the same angle as the angle of the shoulder portion 30 of the locking pin which extends through the wall of the socket nut, that is, 110 to 120 degrees in the example given. The faces of these threads vary in angle with relation to the axis and side wall of the retainer screw, the lower thread face 40 is inclined inwardly and forwardly at substantially 45 degrees and the other inclined thread face 40a is inclined at an angle of substantially 30 degree (110 to 120 degrees relative to the other thread face). Thus the angles of the faces of these threads and the valleys of the threads coincide with the angle of that portion of the locking pin and shoulder 30 which extends through the opening 24 in the inner wall of the socket nut.

The rubber disc backing member permits the locking pins to recede until the peak of the threads 35 pass the angle 30 of the locking pins, and then resiliently and yieldingly urges the angle of the shoulder 30 of the locking pins into engagement in the valley of the threads of the retainer screw. Since the longer faces 45a of the threads are at an angle of 30 degrees those faces will readily slide on the 30 degree taper of the pins so that the pins are depressed and the peak of the threads slide past shoulder 30, and the 45 degree side wall of the pins seat against the 45 degree angle of the lower or shorter face of the threads. Since the 45 degree seat is a locking angle, the pins thus lock the retainer screw and the abrading disc securely against removal by rotation of the head, it being understood that the direction of the thread is counter to the direction of the rotation of the head. When the pins are thus seated in the threads they serve as a complemental thread at the inner face of the socket nut whereby the retainer screw may be removed for changing of the disc by rotation of the retainer screw in the usual manner by means of the screw slot 36.

If desired, one or more reinforcing plates 41 in disc form may be employed as backing reinforcement of the abrading disc 34, obviously being provided with a central opening so that the shank of the retainer screw may be passed therethrough. Normally these reinforcing discs would be made of sheet metal having a degree of flexible resiliency and preferably having a general concavity in their radial faces, whereby the outer circumferential portion of the abrading disc may be flexed against said resilient plates, which has considerable value in sanding or grinding around curved surfaces. If employed, such reinforcing plates may be held in place by an annular ring member 42 having prongs or legs 43 of somewhat springy quality which slide in grooves 44 in the inner wall of the socket nut. This ring member is a temporary holding device serving to hold the metal plates in position when the abrading disc is being changed, since manifestly the reinforcing discs are firmly and securely held in place during the grinding operation by the tightening of the retainer screw to secure the abrading disc in tightly gripped operating relation.

In operation, it is to be assumed that the backing plate 13, socket nut 17, locking pins 27, and the resilient rubber disc 31 are assembled in the manner previously stated, and mounted securely on drive shaft 10. The reinforcing plates 41, if they are employed, are mounted at the outer face of the rim 21 and positioned thereon by the spring ring member 42, the abrading disc 34 being then mounted thereover by inserting the retainer screw 33 through the central opening 34a, whereupon the threaded shank of the retainer screw is inserted in the socket 18 of the socket nut by axial pressure and without necessity for rotation, the threads thereof sliding down against the inclined face of the conical portion at the inner end of the locking pins, the opposite ends of the locking pins receding yieldingly into the wall of the resilient disc to permit the threads of the retainer screw to pass the angle 30 of the pins at a suitable angle of slippage. When the peak of the thread has passed the shoulder 30 of the pin, the thread face 40 which is at a 45 degree angle to the axis of the screw (and correspondingly angled to the side wall of the socket), seats firmly against the side wall face of the locking pin which extends into the socket at 45 degree angle to the socket wall whereby, as each successive thread is inserted in the socket past the shoulder 30, the retainer screw is locked against withdrawal by axial pull thereon, the shoulders 30 of the plurality of locking pins acting as threads within the socket to hold the retainer nut therein.

To remove the retainer screw for replacement of the abrading disc, the retainer screw must be rotated on its axis similar to any ordinary seated screw, the shoulders 30 of the locking pins serving in the manner of complemental threads, the locking pins being rotatable in the tubular bores whereby they serve as rollers against which the threads of the retainer screw may readily roll.

Having thus described the invention, what is claimed as new and patentable is:

1. An abrading head comprising means for supporting an abrading disc on a rotatable shaft, including a socket nut having a smooth bore socket therein, the wall of the socket having a bore therethrough providing an opening in the socket wall, said bore having a stop member at its inner end, at least one locking pin resiliently mounted axially slidable in said bore and the inner end of which is adapted to contact said stop member, an angular portion of the inner end of the pin extending through said opening in the socket wall and providing an angular shoulder within said socket, and a retainer screw having a threaded shank slidably insertable in the socket nut for holding an abrading disc securely on said supporting means, the said angular portion of the inner end of the pin resiliently entering into the groove of the thread of said threaded shank.

2. An abrading head, as set forth in claim 1, the support means including a disc of resilient material having a central opening therethrough to snugly receive the socket nut therethrough, and the outer opposite end of the locking pin being seated against the wall of the central opening of said resilient disc.

3. An abrading head of the character described, as set forth in claim 1, the locking pin being rotatable in said bore.

4. An abrading head having the elements of claim 1, the support means having a disc of resilient material having a central opening therethrough to snugly receive the socket nut therethrough, the opposite end of the pin being seated against the wall of the central opening of the resilient disc, and the angles of the faces of said threads being substantially similar to the angles of the portion of the locking pin which extends into the socket of the socket nut.

5. An abrading head as set forth in claim 1, the locking pin having a conically tapered inner end, the portion of the pin extending into the socket including a circumferential portion of the conical taper.

6. An abrading head as set for in claim 1, and in which the pin extends through the socket wall providing a shoulder, one face of which is the side wall of the pin.

7. Means for supporting an abrading disc on a rotatable shaft including a socket nut having a smooth bore socket therein, the wall of the socket having a plurality of circumferentially spaced bores therethrough at an angle to the axis of the socket wall providing openings in the inner wall of the socket, each of said bores having a stop member at its inner end, a locking pin resiliently mounted slidably in each of said bores and the inner end of which are adapted to contact said stop member, an angular portion of the inner end of the pins extending through said openings in the socket wall and providing an angular shoulder within said socket, a retainer screw having a shank slidably insertable in the socket nut for holding an abrading disc securely on said supporting means, said shank having a plurality of parallelly helical threads, the said angular portion of the inner end of said respective pins resiliently entering into the grooves of said threads.

8. An abrading head of the character described, as set forth in claim 7, the angles of the faces of the screw threads being varied relative to the axis of the screw.

9. An abrading head having the elements of claim 7 and in which the angles of the faces of said threads are substantially similar to the angle of the portion of the locking pins which extend into the socket of the socket nut.

10. An abrading head as set forth in claim 7, and in which the thread face which contacts the side wall of the locking pin has the greater angle, the angle of the faces of said threads being substantially similar to the angle of the portion of the locking pin which extends into the socket of the socket nut.

11. An abrading head as set forth in claim 7, and including a disc of resilient material having a central opening therethrough to snugly receive the socket nut, and the outer opposite end of the locking pins being seated against the wall of the central opening of the resilient disc.

12. An abrading head as set forth in claim 7, said pins having a conical tapered inner end and the portion of the pin which extends into the socket including a circumferential portion of the conical taper.

No references cited.